United States Patent Office 3,637,561
Patented Jan. 25, 1972

3,637,561
SULFONATED PHENOLIC-UREA RESIN SYSTEM
Joel M. Schnur, Agawam, and Rodney M. Huck, Longmeadow, Mass., assignors to Monsanto Company, St. Louis, Mo.
No Drawing. Filed Oct. 21, 1968, Ser. No. 769,396
Int. Cl. C08g 51/24; C09d 5/02
U.S. Cl. 260—29.3
3 Claims

ABSTRACT OF THE DISCLOSURE

A liquid sulfonated phenolic-urea mixed resin system which has improved bench life and low formaldehyde evolution during thermosetting. The system is useful in foundries for the production of sand cores at a rapid rate.

BACKGROUND

The so-called hot-box technique for producing foundry sand cores consists of coating sand typically with from about 1 to 3 total weight percent of a liquid resin and catalyst system (based on total combined weight of sand and system). The so-coated sand is blown under air pressure (usually 50 to 150 p.s.i.) into core boxes maintained at about 400 to 500° F. The sand is held in a core box for only about 10 to 50 seconds, and then is removed therefrom in the form of a sand core. As removed from the box, the sand core is formed, but not fully cured; final core takes place while the core is cooling down to room temperatures. After formation, a core is usually dipped into a so-called core-wash (which comprises a water slurry of refractory materials, such as carbon, iron oxide, graphite, etc.), and then is dried in air to improve the surface finish thereof. The resulting core is then ready for metal pouring.

A superior resin (and catalyst) system adapted for use in the hot-box sand core art must have a number of properties. Thus, in order to perform most desirably such a superior system must, for example, have: (a) storage stability for each of the resin portion and the catalyst portion, respectively, before admixture together prior to use, (b) an adequate bench life, (c) a low formaldehyde evolution during curing (thermosetting), (d) a good tensile strength when cured, (e) the capacity when mixed with sand to thermoset rapidly after being heated to about 400 to 500° F. for less than a minute and then allowed to cool, and (f) the capacity to make sand cores which not only resist premature collapse after metal is cast therein, but also collapse and shake out easily from cooled castings made therein.

Although phenolic-urea resin systems have been heretofore used in the foundry art, the need for improvement in such systems is very great when they are to be used in the hot-box process. Such a system conventionally comprises an aqueous liquid mixture of phenol-formaldehyde resin, urea-formaldehyde resin, and acid curing catalyst (such as NH$_4$Cl). Virtually, all previously known phenolic-urea reasin systems evolve during the course of thermosetting (curing) a considerable amount of obnoxious and even dangerous formaldehyde fumes. In addition, the ambient temperature bench life of such prior art resin systems are generally excessively short for use in the hot-box technique. Furthermore, when such prior art resin systems are used to make cores, the resulting cores, after a casting has been made from such, typically do not break down rapidly enough to permit easy and fast removal of sand from the cool casting.

To improve and specially adapt phenolic-urea resin systems for hot-box usage is a very difficult problem because the multiple reactions occurring in these systems in the course of thermosetting are extremely complex. These different reactions occur both simultaneously and sequentially, and at different respective rates with varying degrees of mutual reinforcement and with various interactions.

There has now been surprisingly discovered a new and useful resin system especially well suited for use in the production of sand cores by the so-called hot-box technique. This resin system utilizes an aqueous solution having dissolved therein a low molecular weight sulfonated resole resin, and a urea-formaldehyde prepolymer. When mixed with sand, the resin system cures by a very complex group of reactions. When suitably catalyzed, this system has both a desirably slow cure at low temperatures, except at low pH (and therefore also a good bench life) and a desirably low formaldehyde evolution before becoming fully thermoset. When the so-catalyzed system is admixed with sand and used in the hot-box process to make cores, it cures substantially completely upon being heated to about 400 to 500° F. for less than a minute followed by cooling in ambient air. The resulting cores display adequate cold tensile strength, and, after use in a casting operation, display neither undesirable premature collapse nor undesirable shake-out characteristics.

SUMMARY

This invention relates to improved aqueous resin solutions especially suited for use in the manufacture of sand cores by the so-called hot-box process; to mixtures of such resin solutions with certain catalyst combinations; to mixtures of such resin solutions with sand; to shaped thermoset sand cores made from such mixtures; and to methods for making and using the same.

The improved aqueous resin solutions of this invention each contain from about 20 to 28 weight percent total resin solids (dry weight basis). The total resin solids composition in such a solution comprises (there being in a given such composition a sum total of 100 parts by weight):

(A) from about 30 to 75 parts by weight of sulfonated resole resin composition, and
(B) from about 20 to 60 parts by weight of urea-formaldehyde prepolymer.

In addition, such a solution has dissolved therein from about 2 to 20 weight percent formaldehyde (based on total solution weight). Also, in such a solution, the total sulfur content ranges from about 1 to 3 weight percent, and the total nitrogen content ranges from about 5 to 16 weight percent (both based on total solution weight).

Although any convenient conventional curing catalyst may be used, it is preferred, especially when use in hot-box core production is involved, to use a curing catalyst comprising (on a dry weight basis in a total composition containing 100 parts by weight): from about 30 to 90 parts by weight of urea, from about 10 to 20 parts by weight of an ammonium salt of a mineral acid, and 0 to about 50 parts by weight water. The relationship between said urea, and said ammonium salts is such that said catalyst has a pH at 25° C. when in a 10 weight percent aqueous solution of from about 6.0 to 8.5. Optionally, the catalyst may contain up to about 2 parts by weight of ammonium hydroxide (when the catalyst is in liquid form).

This catalyst can initially be in a solid or liquid form. If liquid, then the components are preferably dissolved in water, and the solution contains typically from about 30 to 80 weight percent dissolved solids (preferably 40 to 60). If solid, then the components are preferably in the form of solid particles having average maximum sizes under about 1/32 inch each. Preferably, the catalyst is in powder form.

The resin solution and catalyst are stored separately but are brought together and mixed at the time of use. When mixing catalyst with resin, one employs from about 5 to 30 parts by weight (preferably about 10 to 20) of such catalyst for each 100 parts by weight of such resin, though larger and smaller amounts of catalyst can be employed as those skilled in the art will appreciate.

For purposes of this invention, the free-formaldehyde content of a resin solution used in this invention is conveniently determined by the well-known conventional so-called sulfite method. Total solids can be determined by the so-called Owens solids technique.

Similarly, the total (free) formaldehyde evolution from a resin catalyst composition is conveniently determined using the following simulated (standardized) curing conditions:

One thousand milliliters of distilled water are placed into a 2-liter reaction flask fitted with stirrer and thermometer plus condenser and heating mantle. To the flask is added a 100 gram ±0.1 of a sample of the resin mixture. The temperature is adjusted to about 25 to 30° C. and then there is added to the resulting mixture approximately 20 grams of catalyst. The resulting mixture is heated (with stirring) to atmospheric reflux at about 100° C. using a heating time from about 40 to 45 minutes. Thereafter, the mixture is continuously heated under conditions such that moderate boiling under reflux condenser results for 30 minutes. Thereafter, the mixture is cooled down to room temperature rapidly by placing the flask in a pan of cold (about 20° C.) water. When the temperature of the mixture in the flask has dropped to the 25 to 30° range, 50 milliliters of the water phase are poured off for formaldehyde determination, disregarding the cured separated resin. Thereafter, the rest of the contents of the flask are discarded. The free-formaldehyde in this decanted liquid is determined as follows:

A 20±0.1 gram sample of the water phase is weighed into an Erlenmeyer flask, then four to five drops of an indicator solution (such as bromphenolblue indicator solution) are added, and the mixture is titrated with 0.5 N sodium hydroxide (aqueous) to the point where the sample just turns blue as shown by the indicator. Thereafter, there is added 10 ml. of hydroxylamine hydrochloride solution (20 percent in water). The resulting mixture is allowed to stand for five minutes, and then is titrated with 0.5 N sodium hydroxide (aqueous) to the same blue end point. The amount of free formaldehyde is then calculated by the following formula:

$$\text{Free Formaldehyde} = \frac{\text{ml NaOH sol's} \times 1.5}{20}$$

The free-formaldehyde in the water phase is converted to the percent evolved formaldehyde per 100 grams of starting resin and 20 grams of catalyst as follows: The free-formaldehyde value determined by Equation 1 above is multiplied by 11.2 and divided by 1.20.

Although the above procedure gives only a comparison of the evolved formaldehyde, there is a high correlation between this test and the amount of formaldehyde evolved during mixing and blowing operation using a resin and catalyst composition of the invention for the manufacture of hot-box cores.

The bench-life is conveniently determined by green strength measurements of core samples made from resin coated sand which has been stored for pre-determined period prior to sample testing.

In general, the water soluble sulfonated resole resin compositions suitable for use in this invention are composed of two different classes of resinous materials.

One class of these materials are water soluble, methylolated sulfonated phenol-aldehyde resole resins. They are conveniently prepared by contacting under base catalyzed (e.g. above pH 7), liquid phase aqueous conditions a molar excess of formaldehyde with at least one phenol sulfonic acid characterized in its pure acid form by the general formula:

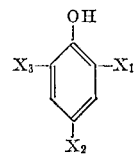

where $X_1$, $X_2$, and $X_3$ are each individually selected from the group consisting of hydrogen, and —$SO_3H$ and at least one other of said X's is hydrogen, the contacting being continued under time, temperature, pressure conditions which taken together are at least sufficient to methylolate said phenol sulfonic acid.

Typical reaction or contacting temperatures range from about 50 C. up to the boiling point of the reaction mixture (temperature of from about 70° C. to 80° C. being preferred). Convenient reaction times typically range from about 1 to 4 hours. Preferably, the pH is maintained in the range of from about 7.5 to 10. At pH values above about 7.5, not only is the sulfonic acid salt formed, but also a sufficient percentage of phenate anions are formed to activate ortho and para positions on the phenyl nucleus relative to the hydroxyl group, which is desirable in methylolating Formula 1 compounds with formaldehyde. At pH values above about 10, the undesirable Canizzaro reaction can occur as a side reaction. Vacuum reflux reaction conditions or other means can be used to limit condensation of product Formula 2 compounds and control reaction temperature (through steam evolution). Organic liquids may be present but it is much preferred that at least 50 weight percent of the total liquid comprising the liquid phase be water.

To maintain the desired basic pH, any basic catalyst conventionally known to the art of resole resins can be employed, such as metal hydroxides of metals from Groups I, II, and III of the Periodic Table of the Elements, but preferably for purposes of this invention alkali metal hydroxide, especially sodium hydroxide, are used. As made, the methylolated sulfonated products are thus in a salt form, cations present having been derived from the base catalyst used.

A preferred class of such a methylolated product is monomeric, contains only a single —$SO_3H$ group in the form of a metal salt or ammonium salt per molecule depending on the cations associated with the base catalyst employed in manufacture, and so is in base form (i.e. is not neutralized or acidified); and has two —$CH_2OH$ (methylol) groups per molecule. The presence of two —$CH_2OH$ groups per molecule insures complete polymerizability of a methylolated and sulfonated product, as those skilled in the art will readily appreciate. For reasons of structural predictability in the ultimate resole resin compositions of the invention, a more preferred class of such preferred class of products contains a single such sulfonic acid salt group per molecule each located in the para position relative to the phenolic (nuclear) hydroxyl groups.

Although such methylolated, sulfonated products can be readily separated as solids or concentrates from a reaction product mixture (as by vacuum distillation of fluids, or the like) for use in this invention, the water soluble methylolated phenol sulfonic acids are employed in the form of aqueous solutions containing from about 30 to 80 weight percent total of such products. More preferred such solutions contain from about 60 to 70 weight percent of such products.

Preferably, such as aqueous solution is prepared so as to contain very little (e.g. less than about 5 weight percent based on total weight of methylolation product) dissolved free formaldehyde, but it can be prepared to contain higher percentages of such, depending upon reaction conditions employed, and the end uses intended for such.

Typically, a water soluble methylolated sulfonated product used in this invention is composed of monomeric and polynuclear derivatives thereof, the relative amount of polynuclear derivatives in any given such product being dependent upon the degree of advancement associated therewith, as those skilled in the art will appreciate.

Water soluble polynuclear derivatives (including dimers, trimers, etc. of such methylolated sulfonated products are readily prepared by heating an aqueous solution of about 30 to 80 weight percent thereof (preferably largely monomeric methylolated phenol sulfonic acid compounds) to temperatures ranging from about 70° C. up to about atmospheric reflux for times sufficient to polymerize or advance the monomeric products and produce the desired polynuclear derivatives thereof.

In general, the mol ratio of combined formaldehyde to phenol in methylolated, sulfonated products (conveniently calculated from the starting phenol sulfonic acid used) in the water soluble products used in this invention can range from about 1:1 to 2:1, although ratios of from about 1.5:1 to 2:1 are preferred. To promote production of such products having a relatively high mol ratio of formaldehyde to phenol, it is preferred to employ a large molar excess of formaldehyde per mol of phenol in batch reactors, a mol ratio of at least 5:1 being more preferred, and a mol ratio of at least 10:1 being still more preferred. The amount of water present is relatively unimportant, though excessively dilute and excessively concentrated aqueous reaction mixtures cut down process efficiency, as those skilled in the art will appreciate. The unreacted formaldehyde remaining at the end of a reaction can be subsequently reacted with post-reaction added phenol to form in situ a phenol aldehyde resin, as described further below.

While Formula 1 compounds can be prepared by methods known to the prior art, a particularly preferred preparation method for the present invention involves reaction of phenol with sulfuric acid under conditions such that for each mol of phenol there is present at least about one mol of sulfuric acid. The reaction or contacting of phenol with sulfuric acid is conducted under liquid phase conditions using sub-atmospheric pressures of from about 20 to 29 in. Hg vacuum at temperatures ranging from about 85° to 95° C. The water generated through reaction of the sulfuric acid with the phenol is continuously removed by distillation from the reaction zone so as to promote a substantially complete reaction between sulfuric acid and phenol, thereby avoiding possible later problems of product purification.

The particular Formula 1 compound used (whether made as just described or otherwise) to make a water soluble, methylolated sulfonated product is water soluble and is conveniently neutralized and made basic with a base catalyst as indicated above before reaction with formaldehyde.

The second class of materials used to make the sulfonated resole resin compositions employed in this invention are conventional, water soluble, non-sulfonated thermosettable phenol-aldehyde resole resin. These resins are mixed with the above-described methylolated, sulfonated products in quantities at least sufficient to make the resulting resin composition thermosettable since by themselves these methylolated, sulfonated products are characteristically poorly or not-at-all thermosettable by the action of heat alone. Because the number of reaction sites available in a given conventional resole resin are variable from one such product to another, it will be appreciated by those skilled in the art that no definite numerical limitations can be or need be used to describe for all cases the exact minimum quantity of a conventional resole resin which must be added to or composited with a methylolated, sulfonated product to make the composite composition thermosettable by the action of heat alone. Commonly as little as 10 parts by weight of conventional resole resin per 100 parts by weight of methylolated, sulfonated product is sufficient to impart thermosettability to the resulting composition. Up to 2000 or even more parts by weight of a conventional resole resin per 100 parts by weight of a methylolated, sulfonated product can advantageously be employed, the ratio used in any given instance being influenced by the particular composition properties desired and the end use intended.

Preferably, for each 100 parts by weight of such methylolated sulfonated product, one preferably employs from about 100 to 1500 parts by weight (200 to 500 being more preferred) of such conventional resole resin. In any given instance, the minimum quantity of a particular conventional resole resin employed is such that the total mixture of methylolated, sulfonated product and conventional resole resin is thermosettable at about 110° C.

For purposes of this invention, the term "thermosettable" has conventional reference to materials which solidify and crosslink on heating to produce a substantially solvent insoluble mass which cannot be remelted.

Similarly, the term "conventional, water soluble, non-sulfonated thermosettable phenol-aldehyde resole resin," or, briefly "conventional resole resin," has reference to a resole resin formed by the condensation of a phenol with an aldehyde condensable therewith (especially formaldehyde) under base catalyzed (e.g. above pH 7) liquid phase aqueous conditions so that the condensate typically contains at least 1 mol of combined aldehyde per mol of phenol, and preferably has a mole ratio of from about 1.2:1 to 3:1 combined aldehyde to phenol. Such resins are well known to the prior art.

To produce a conventional resin for use in this invention, a phenol can be neutralized and made basic under aqueous liquid phase conditions, as by the addition of base, and then preferably from about 0.8 to 3.0 mols of aldehyde per one mol of phenol (more preferably from about 1.0 to 2.5 mols aldehyde per mole of phenol) are mixed with the base catalyzed phenol. Phenol itself and for maldehyde are preferred starting materials. Water may be added with the aldehyde. With formaldehyde added, water is preferred, as when Formalin is used. Also, a basic catalyst material conventionally known to the art of resole resins (referred to above) such as hexamethylenetetramine, ammonium hydroxide, triethylamine, sodium hydroxide, or mixtures thereof (or the like) is introduced into the reaction mixture. This basic catalyst can be used to neutralize the staring substituted phenol. The pH of this reaction mixture is maintained above 7.0 and preferably in the range from about 7.5 to 8.5. Typical reaction temperatures range from about 50° C. up to the boiling point (i.e. reflux conditions) of the reaction mixture (temperatures of from about 70 to 80° C. being preferred). Convenient reaction times typically range from about 20 minutes to 4 hours. Aqueous liquid phase preparation conditions are generally but not necessarily used.

The term "aldehyde" has established meanings of scope in the art of thermosetting resins and is used throughout this disclosure and claims in accordance therewith. Although formaldehyde is preferably employed as the aldehyde in the formation of the conventional resins used in this invention, other aldehydes known to the phenol aldehyde resin art, including aliphatic aldehydes, such as acetaldehyde, propionaldehyde, butyraldehyde, and the like; aromatic aldehydes, such as benzaldehyde, and the like; cyclic aldehydes such as furfural aldehyde, and the like, and mixtures of such, are usable to make such resins. Similarly, the term "a phenol" used in reference to a phenol aldehyde resin herein has reference to a compound containing one phenyl group, one or even two nuclear hydroxyl groups, which is optionally substituted with a methyl or ethyl group, and which compound is reactable with formaldehyde in water under basic pH. Examples include cresol, xylenol, resorcinol, and the like. It will be appreciated that the aldehyde to phenol ratios herein described have reference to the total amount of a phenol present before a reaction.

For purposes of this invention, such conventional resole resins are employed in the form of aqueous solutions containing from about 30 to 80 weight percent of such resin. More preferred solutions contain from about 60 to 70 weight percent of such resins.

A preferred class of conventional resole resins suitable for use in this invention is characterized by the general formula:

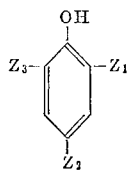

where $Z_1$, $Z_2$, and $Z_3$ are each selected from the group consisting of hydrogen and —$CH_2OH$, and, in any given molecule thereof, at least one of said Z's is —$CH_2OH$; and the water soluble polynuclear derivatives thereof (including dimers and trimers).

The conventional resole resins employed in this invention preferably have a free formaldehyde content which is less than about 5 weight percent (based on total conventional resole resin weight).

Simple physical (mechanical) procedures are generally suitable for mixing a preformed conventional resole resin with a preformed methylolated sulfonated product to make a sulfonated resole resin composition for use in this invention. Preferably, such a composition is prepared in the form of an aqueous solution which contains a total of from about 30 to 80 (preferably from about 60 to 70) weight percent (combined) of dissolved methylolated, sulfonated product and of dissolved conventional resole resin. At the time when a conventional resole resin is mixed with methylolated phenol sulfonic acid, it is desirable to have the methylolated sulfonated product in a basic form so as to prevent premature or undesired reaction of the sulfonic acid group and (possibly) undesirable premature crosslinking of the product composition.

Those skilled in the art will appreciate from the foregoing teachings that one can conveniently prepare a thermosettable sulfonated resole resin composition for use in this invention in a single vessel or reactor by appropriate reaction techniques and by addition of reactants in a proper sequence and order. For example, one can react phenol with sulphuric acid to form Formula 1 compounds by the preferred route as taught above, and then this material can be neutralized and made basic with excess caustic as taught above. Next, such product is reacted with an excess of formaldehyde (e.g. Formalin) to form a water soluble methylolated, sulfonated product as taught above. Subsequent addition of phenol (preferably immediately) produces a system which with heat will react with excess formaldehyde present to generate in situ a water soluble conventional resole resin. Excess formaldehyde can be added as taught above. Hence, as used herein, the term "mixing" in reference to blending conventional resole with methylolated phenol sulfonic acid includes in situ generation as described herein. Such an aqueous solution of a mixture of methylolated sulfonated product and conventional resole resin is used in a preferred product of this invention.

In general, urea-formaldehyde prepolymer starting materials suitable for use in this invention and having the above-indicated nitrogen content can be prepared by any conventional method. In general, they are water soluble and preferably have a nitrogen content of from about 24 to 30 weight percent (total dry weight basis of urea-formaldehyde prepolymer). A suitable preparation procedure, for example, involves the reaction of 2 or 3 mols of formaldehyde with 1 mol of urea at about 100° C. and a pH range from about 6.0 to about 6.5 (suitably adjusted conveniently by a caustic addition) under liquid aqueous conditions. The resulting resin is made preferably basic with the addition of further caustic to provide a pH in the range of from about 7.2 to 8.5, the preferred range for this resin as used in this invention. Thereafter, the resulting mixture is conveniently dehydrated under vacuum to obtain a desired solids content (for example, ranging from about 50 to 75 weight percent).

To prepare the resin solution of this invention from the above-indicated respective, separately prepared sulfonated resole resin composition and urea-formaldehyde prepolymer, one can simply mix appropriate quantities of the sulfonated resole resin composition, and the urea-formaldehyde prepolymer together so as to produce a resin solution having the above-indicated properties. Optionally, water is added as a diluent.

The admixing of the respective resin components can be accomplished in any desired manner. Thus, for example, it is convenient to simply charge a predetermined proportion to a convenient mixing vessel and agitate the resulting mixture to achieve a desired liquid blend.

In a preferred class of resin solutions of this invention, each solution contains from about 50 to 75 weight percent total resin solids (dry weight basis) and the total resin solids composition in such a solution comprises (there being in a given such composition a sum total of 100 parts by weight):

(A) from about 40 to 70 parts by weight of sulfonated resole resin, and (B) from about 60 to 30 parts by weight of ureaformaldehyde prepolymer, In addition, such a preferred solution has (a) dissolved therein from about 3 to 15 weight percent formaldehyde, (b) a total sulfur content of from about 1 to 3 weight percent, and (c) a total nitrogen content of from about 8 to 12 weight percent (all based on total solution weight).

In preparing the above-indicated preferred curing catalysts for use in the compositions of the present invention, it is generally preferred to prepare the catalyst in the form of a water solution by dissolving appropriate proportions of the respective ingredients (urea, ammonium hydroxide (optional) and ammonium salts, all as indicated above) by any convenient solution procedure. In general, when powders are used, powder sizes below about 16 mesh (U.S. standard sieve) are preferred.

Examples of ammonium salts of mineral acids include ammonium nitrate, ammonium phosphate, ammonium chloride (preferred) and the like.

A more preferred curing catalyst for use in this invention is in the form of a water solution having from about (liquid basis) 10 to 25 parts by weight of ammonium chloride, from about 30 to 50 parts by weight of urea, and from about 0.5 to 2 parts by weight of ammonium hydroxide. In this more preferred formulation, the pH of a 10 weight percent aqueous solution falls in the range of from about 7.0 to 8.5 at 20 °C.

The relationship between a resin system (as described above) and a more preferred catalyst (as described above) is such that when from about 10 to 30 weight percent (based on total liquid starting combined weight) of the catalyst is admixed with the resin mixture the resulting system is characterized by evolving a total amount of formaldehyde of less than about 10 percent) preferably less than about 6 percent).

When a resin system of this invention, as well as the preferred catalyst are admixed (separately or concurrently) with sand so as to produce a mixture comprising from about 95 to 98.5 weight percent sand and the balance up to 100 weight percent thereof being resin solution and preferred catalyst in the relative proportions of each described above, it is found that the resulting sand composition mixture has the capacity to thermoset rapidly after being heated to about 400 to 500° F. for less than a minute and then allowed to cool such as is done, for example, in the so-called hot-box techniques for producing sand cores. Specifically, a resin and catalyst system of this invention is substantially completely cured following such a heating cycle involving the heating of a mixture of sand and resin as above described to a temperature to about 400° F. for a time of about 40 seconds followed by being placed in room temperature air and allowed to cool to room temperature.

In addition, it is found that a resin-catalyst-sand-cured composition as prepared as just above described has adequate cold tensile strength. Typical tensile strengths for these combinations generally fall in the range of from about 200 to 300 p.s.i. Bench lives are characteristically excellent.

In addition, it is observed that sand cores made from the resin and catalyst composition of this invention not only resist premature collapse after hot metal is cast thereinto, but also will collapse readily and shake out easily from the cooled castings made therein. The absence of premature collapse is observed visually by allowing a sand casting covered with hot metals to cool and observing the absence of collapse therein. After the casting has been allowed to cool, the shake out is used to determine in effect how easily the core can be removed after a casting operation.

When measuring tensile strength of a core of the invention, it is convenient to measure both hot tensile strength and cold tensile strength. The hot tensile strength determines whether or not the core is firm enough to retain its shape when ejected from the core box and is handled in a foundry. The cold tensile strength represents the final strength of the cured core and determines the core's ability to withstand assembly and the weight of the metal during casting. Hot and cold tensile strengths are conveniently determined using a so-called Dietert tensile tester (a product of the H. W. Dietert Company). As the name implies, hot tensile strength is measured using a core as ejected from a core box while cold tensile strength is measured on a core which has been cooled to room temperature following ejection from the box.

To determine shake out, one convenient procedure is to place a sample core in a preheated porcelain dish in a muffle furnace at about 1600° F. for two minutes. Thereafter, the disk is removed and a specimen is placed on a tared 20 mesh screen. The screen is then vigorously vibrated for 30 seconds. Thereafter, the screen is weighed to determine the amount of material retained thereon. This procedure is repeated using heating times in increments of 30 seconds, until the amount retained on the screen is less than 10 grams. Typical hot tensile strengths using compositions of this invention range from about 50 to 60 p.s.i.; typical cold tensile strengths range from about 200 to 300 p.s.i.; and typical shake-out times range from about 4.5 to 5.5 minutes.

EMBODIMENTS

The following examples are set forth to illustrate more clearly the principles and practice of this invention to one skilled in the art and they are not intended to be restrictive but merely to be illustrative of the invention herein contained.

Example A

Sulfonated resole preparation from phenol, sulfuric acid, and aldehyde:

To 200 grams phenol at 90° C. are added 210 grams of concentrated sulfuric acid over a 60 minute interval, maintaining the temperature at 90° C. The mixture is held an additional 60 minutes at 90° C. 400 grams of water are added and the mixture is cooled while adding 500 grams of 50% NaOH. 1500 grams of 50% Formalin are then added and reacted for 1 hour at 80° C. Infra-red analysis of the reaction mixture shows presence of hydroxymethyl groups and sulfonic groups indicating presence of α-methylolated, sulfonated product.

Example B

Preparation of thermosettable sulfonated resole resin system with in situ generated phenol-formaldehyde resole:

400 grams of phenol sulfonic acid is dissolved in 400 grams of water and to this mixture is added, with cooling, 500 grams of 50% NaOH. 2500 grams of 50% Formalin are added and the mixture reacted for 2 hours at 70° C. At this point, presence of a methylolated, sulfonated product is shown by infra-red analysis. To the cooled reaction mixture is added 1600 grams phenol and sufficient 50% NaOH to adjust pH to the range 8–10. Reaction is then continued for 3–4 hours at 65–70° C. until the excess formaldehyde is consumed and the reaction mixture is then cooled thus forming a dissolved resole of Formula 2 in admixture with a dissolved methylolated, sulfonated product. This material, when spread on the surface of a cure plate at 130–180° C., cures to a thermoset film and may also be cured by heating after application to a convenient substrate.

Suitable urea-formaldehyde resins for use in this invention are as follows:

Example C

In a reaction kettle is placed 200 parts by weight of 50 weight percent Formalin. To the Formalin is added 0.43 parts by weight glacial acetic acid solution. The resulting mixture is neutralized with 33 weight percent aqueous potassium hydroxide solution, and has a pH ranging from about 6.4 to 7.0. Next, to the mixture is added 100 parts by weight of crystalline urea and the mixture is heated to atmospheric reflux temperatures for about 2 hours. Thereafter, the mixture is cooled to 40° C. and neutralized with about a 33 weight percent potassium hydroxide solution to produce a product mixture having a pH of about 7.0 to 8.0. This product mixture is dehydrated under vacuum to the desired solids level (see below). The yield of urea-formaldehyde resinous product is about 225 weight percent (based on starting urea). This product has the following characteristics:

Total solids—67–69%
Viscosity—1000–2400 cps.
Free-formaldehyde (sodium sulfite method)—3.0–6.0%
pH at 25° C.—7.2–8.2
Refractive index at 25° C.—1.4900–1.4950
Water dilutability—50 to 1
Total nitrogen content—18–24%

Example D

In a reaction kettle is placed 200 parts by weight of 50 percent Formalin. To the Formalin is added .55 part by weight of propionic acid. The resulting mixture is neutralized with 33 weight percent aqueous potassium hydroxide and has a pH ranging from about 6.4 to 7.0. Next, to the mixture is added 80 parts by weight of crystalline urea and the mixture is heated at atmospheric reflux for about 2 hours. Thereafter, the mixture is cooled to 60° C. and there is added to it 20 parts by weight of crystalline urea. The mixture is held thereafter at about 60° C. for about 30 minutes. Thereafter, the mixture is cooled and neutralized with a 33 weight percent potassium hydroxide solution to produce a product mixture having a pH of about 7.0 to 8.0. This product mixture is dehydrated under vacuum in a similar manner as indicated in Example F.

Suitable curing catalysts for use with a resin composition of the present invention are as follows:

Example E

To a blender is charged about 3 parts by weight of fuller's earth. Then about 80 parts by weight crystalline urea (20–200 mesh and about 15 parts by weight of ammonium chloride (20–200 mesh) are added. Blending is continued until a homogeneous mixture is obtained.

Example F

To a mixing vessel is charged about 45 parts by weight of water which is then heated to about 35° C. About 14 parts by weight ammonium chloride and 40 parts by weight of urea are added. When there are dissolved, about 1 part of ammonium hydroxide is added, and mixing is continued to obtain a homogeneous solution.

Each of the resin prepolymer products of Examples A through F above are used to prepare resin mixtures as detailed in the following Table 1 below. Admixing in all cases is accomplished by pouring the indicated amount of resin into a beaker and stirring until a homogeneous liquid mixture is obtained.

Thereafter each of the resin mixtures shown in Table 1 is admixed with the indicated catalyst of Example E or F to produce a phenolic-urea resin and catalyst composition of the invention. Each such composition is then tested for formaldehyde evolution. The results are tabulated in the following Table 2 below.

TABLE 1.—LIQUID RESINS

|  | G | H | I | J |
|---|---|---|---|---|
| Sulfonated Phenolic A | 50 | 55 | | |
| Sulfonated Phenolic B | | | 55 | 65 |
| Urea-Formaldehyde C | 50 | | 45 | 35 |
| Urea-Formaldehyde D | | 45 | | |

TABLE 2.—RESIN PLUS CATALYST SYSTEM

| Example No. | Resin blend | Catalyst | Catalyst, p.p.h. resin | Formaldehyde evolved percent |
|---|---|---|---|---|
| 1 | G | E | 20 | <6.0 |
| 2 | H | E | 25 | <5.0 |
| 3 | I | F | 20 | <4.0 |
| 4 | J | F | 20 | <5.0 |

When each of the foregoing catalysts and resin compositions of Examples 1 through 4 is first mixed with Grand Haven sand so as to provide a mixture in which about 2 weight percent thereof is composed of a resin and catalyst system (total combined weight) and then used to prepare cores, the following tensile strengths, bench life, and shake-out characteristics are observed, as recorded in Table 3 below. In this procedure, a so-called Redford core blower (as made by the Redford Company) is employed to make the cores, and the resin coated sand is blown under an air pressure of about 80 p.s.i. into core boxes maintained at about 450° F. for 40 seconds to produce standard one inch A.F.S. (American Foundry Society) tensile specimens.

TABLE 3.—RESIN/CATALYST SYSTEM MIXTURE WITH SAND

| Example No. | 1 | 2 | 3 | 4 |
|---|---|---|---|---|
| Resin blend | G | H | I | J |
| Percent resin (on sand) | 2 | 2 | 2 | 2 |
| Catalyst | E | E | F | F |
| Percent catalyst (on resin) | 20 | 25 | 20 | 20 |
| Hot tensile (p.s.i.) | 66 | 70 | 55 | 60 |
| Cold tensile (p.s.i.) | 275 | 250 | 250 | 250 |
| Bench life at 95° F. (min.) | 120 | 120 | >240 | >240 |

In foregoing examples numbers 1 and 2, the sand resin catalyst mixture before the same is formed into cores as described has added thereto 1½ parts of core oil for each 2500 parts of sand. The core oil is used as a processing aid and is an unsaturated, light (e.g. viscosity of from about 100 to 400 cps.) oil available commercially under the trade designation Aristo 585 (a trademark of the Aristo Co.).

What is claimed is:

1. A thermosettable sulfonated phenolic-urea resin composition adapted for use in the manufacture of foundry cores comprising:
   (A) an aqueous resin solution having dissolved therein from about 20 to 80 weight percent total resin solids (dry weight basis),
   (B) the composition of said total resin solids comprising (on a 100 parts by weight dry total basis):
   (1) from about 30 to 75 parts by weight of a thermosettable sulfonated resole resin composition which comprises:
      (a) water soluble, methylolated, sulfonated condensate of formaldehyde with at least one phenol sulfonic acid characterized in its pure acid form by the general formula:

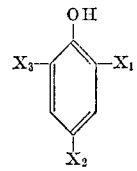

where $X_1$, $X_2$, and $X_3$ are each individually selected from the group consisting of hydrogen, and —$SO_3H$, and, in any given molecule thereof at least one of said X's is —$SO_3H$, and at least one other of said X's is hydrogen,
      (b) water soluble thermosettable phenol-aldehyde resole resin,
      (c) there being at least sufficient quantities of said phenol-aldehyde resole resin present to make the resulting sulfonated resole resin composition thermosettable at 110° C.,
   (2) from about 20 to 60 parts by weight of a ureaformaldehyde prepolymer,
   (C) said solution having further dissolved therein from about 2 to 20 weight percent formaldehyde (based on total composition weight), and
   (D) said solution having a total nitrogen content ranging from about 5 to 16 weight percent and having a total sulfur content ranging from about 1 to 3 weight percent (each based on total composition weight).

2. The composition of claim 1 containing in addition in admixture therewith a catalyst composition comprising (on a 100 parts by weight basis):
   (1) from about 30 to 90 parts by weight urea,
   (2) from about 10 to 20 parts by weight of an ammonium salt of a mineral acid, and
   (3) from 0 to about 50 parts by weight water, the relationship between said urea and said ammonium salts in said catalyst composition being such that said catalyst has a pH at 25° C. when in a 10 weight percent aqueous solution of from about 6.0 to 8.5 there being for each 100 parts by weight of said resin composition from about 5 to 30 parts by weight of said catalyst composition.

3. A composition suitable for the manufacture of foundry said cores comprising in combination a homogeneous mixture of from about 95 to 98.5 weight percent and the balance up to 100 weight percent comprising a composition of claim 2.

References Cited

UNITED STATES PATENTS

| 3,076,772 | 2/1963 | Christ | 260—29.3 |
| 3,306,864 | 2/1967 | Lang et al. | 260—840 |
| 3,322,702 | 5/1967 | Smucker et al. | 260—29.3 |
| 3,404,198 | 10/1968 | Guyer | 260—29.3 |
| 3,475,113 | 10/1969 | Sellet | 260—840 |

OTHER REFERENCES

Kressman et al., J. Chem. Soc., 1949, pp. 1190–1193.

DONALD J. ARNOLD, Primary Examiner

U.S. Cl. X.R.

260—29.4, 38, 39, 49, 840